United States Patent
Sato et al.

(10) Patent No.: US 6,224,190 B1
(45) Date of Patent: May 1, 2001

(54) INK-JET RECORDING METHOD AND DEVICE

(75) Inventors: Hitoshi Sato; Kazuyoshi Takahashi; Hideki Sekiya, all of Tokyo (JP)

(73) Assignee: Copyer Co., Ltd., Tokyo (JP)

(*) Notice: Subject to any disclaimer, the term of this patent is extended or adjusted under 35 U.S.C. 154(b) by 0 days.

(21) Appl. No.: 09/601,914

(22) PCT Filed: Feb. 9, 1999

(86) PCT No.: PCT/JP99/00550
§ 371 Date: Aug. 8, 2000
§ 102(e) Date: Aug. 8, 2000

(87) PCT Pub. No.: WO99/39911
PCT Pub. Date: Aug. 12, 1999

(30) Foreign Application Priority Data

Feb. 9, 1998 (JP) ................................................. 10-044488

(51) Int. Cl.[7] .................. B41J 2/21; B41J 2/47; B41B 1/00
(52) U.S. Cl. .................. 347/43; 347/251; 358/1.1
(58) Field of Search ...................... 347/43, 251; 358/1.1, 358/1.9

(56) References Cited

U.S. PATENT DOCUMENTS 5,563,985   10/1996   Klassen et al. ........................ 358/1.9
5,649,071 * 7/1997   Klassen et al. ........................ 358/1.9
6,081,340 * 6/2000   Klassen ................................. 358/1.1

FOREIGN PATENT DOCUMENTS 61-290060   12/1986   (JP).
7-245716    9/1995    (JP).

* cited by examiner

Primary Examiner—Thinh Nguyen
(74) Attorney, Agent, or Firm—Dellett and Walters

(57) ABSTRACT

An ink-jet recording method which hardly causes ink to blur. To this end, there are provided a correction table (30) which contains the number of ejection ink dots of each color limited in advance according to the combination of the numbers of ejection ink dots instructed for respective colors in a unit area in such a way that the total number of ejection ink dots does not exceed a predetermined limit value, and an error table (31) which contains the errors which may be produced when determining the limited numbers of ejection ink dots of the colors and which are previously calculated and determined according to the combination of the numbers of ejection ink dots instructed for the colors in the unit area. Before printing, a corrected number of ejection ink dots for each color in each unit area is determined from the correction table (30) according to the combination of the numbers of ejection ink dots on which each head is instructed based on binary image data (S25). At this time, the errors listed in the error table (31) are accumulated for every unit area (S27), the integer part, if appears in the accumulated value, is made to affect the numbers of ejection ink dots, and the accumulated error is updated (S25).

14 Claims, 8 Drawing Sheets

FIG. 6

| 1 | 3 | 2 | 4 |

EVEN-NUMBERED RASTER

| 4 | 2 | 1 | 3 |

ODD-NUMBERED RASTER

FIG. 7

CORRECTION TABLE 30

| INSTRUCTED AMOUNT OF INK EJECTION | | | | CORRECTED INK EJECTION AMOUNT WHEN LIMITED TO 100% | | | |
|---|---|---|---|---|---|---|---|
| I k | I c | I m | I y | T k | T c | T m | T y |
| 0 | 0 | 0 | 0 | 0 | 0 | 0 | 0 |
| 0 | 0 | 0 | 1 | 0 | 0 | 0 | 1 |
| 0 | 0 | 0 | 2 | 0 | 0 | 0 | 2 |
| ≈ | | | | | | | ≈ |
| 2 | 1 | 1 | 0 | 2 | 1 | 1 | 0 |
| 2 | 1 | 1 | 1 | 1 | 1 | 1 | 1 |
| 2 | 1 | 1 | 2 | 1 | 1 | 1 | 1 |
| 2 | 1 | 1 | 3 | 0 | 1 | 1 | 2 |
| 2 | 1 | 1 | 4 | 0 | 1 | 1 | 2 |
| 2 | 1 | 2 | 0 | 1 | 1 | 2 | 0 |
| 2 | 1 | 2 | 1 | 1 | 1 | 1 | 1 |
| 2 | 1 | 2 | 2 | 1 | 1 | 1 | 1 |
| 2 | 1 | 2 | 3 | 0 | 1 | 1 | 2 |
| 2 | 1 | 2 | 4 | 1 | 0 | 1 | 2 |
| 2 | 1 | 3 | 0 | 1 | 1 | 2 | 0 |
| 2 | 1 | 3 | 1 | 0 | 1 | 2 | 1 |
| 2 | 1 | 3 | 2 | 0 | 1 | 2 | 1 |
| 2 | 1 | 3 | 3 | 1 | 0 | 1 | 1 |
| 2 | 1 | 3 | 4 | 1 | 0 | 1 | 2 |
| 2 | 1 | 4 | 0 | 1 | 1 | 2 | 0 |
| 2 | 1 | 4 | 1 | 0 | 1 | 2 | 1 |
| 2 | 1 | 4 | 2 | 1 | 0 | 2 | 1 |
| 2 | 1 | 4 | 3 | 1 | 0 | 2 | 1 |
| 2 | 1 | 4 | 4 | 1 | 0 | 1 | 1 |
| 2 | 2 | 0 | 0 | 2 | 2 | 0 | 0 |
| ≈ | | | | | | | ≈ |
| 4 | 4 | 4 | 2 | 1 | 1 | 1 | 1 |
| 4 | 4 | 4 | 3 | 1 | 1 | 1 | 1 |
| 4 | 4 | 4 | 4 | 1 | 1 | 1 | 1 |

FIG. 8

ERROR TABLE 31

| INSTRUCTED AMOUNT OF INK EJECTION | | | | ERROR WHEN LIMITED TO 100% | | | |
|---|---|---|---|---|---|---|---|
| Ik | Ic | Im | Iy | Ek | Ec | Em | Ey |
| 0 | 0 | 0 | 0 | 0.0 | 0.0 | 0.0 | 0.0 |
| 0 | 0 | 0 | 1 | 0.0 | 0.0 | 0.0 | 0.0 |
| 0 | 0 | 0 | 2 | 0.0 | 0.0 | 0.0 | 0.0 |
| 2 | 1 | 1 | 0 | 0.0 | 0.0 | 0.0 | 0.0 |
| 2 | 1 | 1 | 1 | 0.6 | -0.2 | -0.2 | -0.2 |
| 2 | 1 | 1 | 2 | 0.333 | -0.333 | -0.333 | 0.333 |
| 2 | 1 | 1 | 3 | 1.142 | -0.428 | -0.428 | -0.285 |
| 2 | 1 | 1 | 4 | 1.0 | -0.5 | -0.5 | 0.0 |
| 2 | 1 | 2 | 0 | 0.6 | -0.2 | -0.4 | 0.0 |
| 2 | 1 | 2 | 1 | 0.333 | -0.333 | 0.333 | -0.333 |
| 2 | 1 | 2 | 2 | 0.142 | -0.428 | 0.142 | 0.142 |
| 2 | 1 | 2 | 3 | 1.0 | -0.5 | 0.0 | -0.5 |
| 2 | 1 | 2 | 4 | -0.111 | 0.444 | -0.111 | -0.222 |
| 2 | 1 | 3 | 0 | 0.333 | -0.333 | 0.0 | 0.0 |
| 2 | 1 | 3 | 1 | 1.142 | -0.428 | -0.285 | -0.428 |
| 2 | 1 | 3 | 2 | 1.0 | -0.5 | -0.5 | 0.0 |
| 2 | 1 | 3 | 3 | -0.111 | 0.444 | 0.333 | 0.333 |
| 2 | 1 | 3 | 4 | -0.2 | -0.4 | 0.2 | -0.4 |
| 2 | 1 | 4 | 0 | 0.142 | -0.428 | 0.285 | 0.0 |
| 2 | 1 | 4 | 1 | 1.0 | -0.5 | 0.0 | -0.5 |
| 2 | 1 | 4 | 2 | -0.111 | 0.444 | -0.222 | -0.111 |
| 2 | 1 | 4 | 3 | -0.2 | -0.4 | -0.4 | 0.2 |
| 2 | 1 | 4 | 4 | -0.272 | 0.363 | 0.454 | 0.454 |
| 2 | 2 | 0 | 0 | 0.0 | 0.0 | 0.0 | 0.0 |
| 4 | 4 | 4 | 2 | 0.142 | 0.142 | 0.142 | -0.428 |
| 4 | 4 | 4 | 3 | 0.066 | 0.066 | 0.066 | -0.2 |
| 4 | 4 | 4 | 4 | 0.0 | 0.0 | 0.0 | 0.0 |

INK-JET RECORDING METHOD AND DEVICE

TECHNICAL FIELD

The present invention relates to an ink-jet recording device which records a color image by putting a plurality of ink dots on the same pixel position using multiple-ink-color heads.

BACKGROUND ART

Usually, an ink-jet recording device repeatedly moves a recording head, with a plurality of ink-ejecting nozzles arranged thereon, in the direction different from the nozzle arrangement direction to form a band of image area (band) during one movement. This repeated one-band image recording, one band for each specific amount of movement of recording medium, completes one whole image recording.

Today, there are a variety of recording media for use in the ink-jet recording device. Among these recording media, print results look much more beautiful on lustrous paper or film than on plain paper. Furthermore, the ink-jet recording device may print on cloth such as cotton or enamel. This demand will grow in future.

However, some of these media described above do not absorb ink well, and some others are easily blurred. Printing on these recording media results in an overflow of ink in a high-density print area, significantly degrading the print image quality. This degradation depends on the characteristics of the recording media. The overflow of ink also dirties some mechanical parts of the ink-jet recording device, such as a platen, sometimes affecting print operations.

The conventional solution to this problem is that the ink ejection amount is limited by a masking that is performed during the preprocessing of conversion from gray-scale images to binary (bi-level) images.

However, the prior art described above has the drawbacks described below because the correction is made on an image signal basis.

First, a popular ink-jet recording device is connected, in most cases, to a computer terminal. This computer terminal performs image processing, such as conversion to binary values, and transfers the processed result to the ink-jet recording device for recording thereon. However, an image input unit or an image processing unit which processes multi-valued signals, if built in an ink-jet recording device, would increase the cost and the processing time and, therefore, they are not standard on a popular ink-jet recording device. When an ink-jet recording device performs correction on an image signal basis, conversion from gray-scale images to binary images waists time and the recording speed is reduced. An ink-jet recording device according to the present invention makes correction, not on multi-valued signal, but on binary image data.

It is therefore an object of the present invention to prevent image quality degradation caused by a blur on the recording medium by limiting, through binary image processing, the ink ejection amount to a level at which no image degradation is caused by a blur on the recording medium.

It is another object of the present invention to reduce the change in color and to produce a good-quality color image recording even when the ink ejection amount is limited during color image recording.

DISCLOSURE OF INVENTION

An ink-jet recording method according to the present invention is an ink-jet recording method for putting a plurality of ink dots on the same pixel position using multiple-color ink heads to record a color image, the ink-jet recording method comprising the steps of:

(a) dividing a whole image area into a plurality of unit areas each composed of a predetermined plurality of pixels;

(b) for each unit area of the image to be recorded, calculating a total of ejection ink dots instructed to be printed in the unit area;

(c) checking if the calculated total of ink dots exceeds a predetermined limit value;

(d) if so, proportionally distributing the limit value to colors according to mutual ratios among numbers of ink dots of the colors to be ejected in the unit area and rounding each of distribution results to an integer to determine a number of ejection ink dots of each color in the unit area;

(e) correcting the instructed number of ink dots of each color by reducing the same based on the determined number of ejection ink dots of each color; and (f) ejecting ink from each head into the unit area according to the corrected number of ejection ink dots.

As described above, a check is made for each unit area as to whether the total of the ink dots therein exceeds a predetermined limit value. If the total exceeds the predetermined limit value, the number of ejection ink dots of each color is reduced in such a way that the limit value is proportionally distributed among the colors according to the ratio of the number of ejection ink dots of each color in the unit area. As a result, the image quality degradation of a printed matter caused by an ink blur may be reduced by limiting the ink ejection amount in a high-density print area to a given level while keeping the change in color to a minimum.

Preferably, when reducing the number of ejection ink dots in step (e), the ejection ink dots are thinned out according to an ejection ink dot reduction priority pre-established for each pixel position in the unit area. More specifically, the priority is established so that the ejection ink dots of adjacent pixels in the unit area are not thinned out consecutively and so that thinning-out orders of adjacent pixels are different between adjacent unit areas. This prevents an uneven distribution in the image caused by thinning-out.

Preferably, an error generated by rounding the result of the proportional distribution of the limit value to the integer, in step (d), is accumulated and passed to an adjacent unit area for each area and, when an absolute value of the accumulation value becomes 1 or larger, the accumulation value is reflected on the determined number of ejection ink dots of each color in the adjacent unit area. This compensates for an error generated by rounding and substantially prevents the color from being changed.

When the total of the numbers of ejection ink dots of the colors exceeds the limit value, the number of ejection ink dots of the colors is reduced by the exceeded number of the ejection ink dots according to a predetermined color order, and, for the color whose ejection ink dots have been reduced, the number of reduced ejection ink dots is added to the error of the color in the unit area. This prevents the total of the ejection ink dots from exceeding the limit value after the numbers of ejection ink dots are rounded to integers.

An ink-jet recording device according to the present invention is an ink-jet recording device which puts a plurality of ejection ink dots on the same pixel position using multiple-color ink heads to record a color image, the ink-jet recording device comprising a plurality of heads each of which ejects ink droplets based on binary image data; a correction table which contains a number of ejection ink dots of each head limited in advance according to a combination of the numbers of ejection ink dots instructed to be ejected for respective colors in a unit area in such a way that the total number of ejection ink dots does not exceed a predetermined limit value, the unit area being composed of a predetermined plurality of pixels; an error table which contains errors which may be produced when determining the limited numbers of ejection ink dots of the colors and which are previously calculated and determined according to the combination of the numbers of ejection ink dots specified for the colors in the unit area; and a control means for controlling an ink ejection of the plurality of heads based on the corrected binary image data, wherein the control means sequentially processes a plurality of consecutive areas, one unit area at a time, during which the correction table and the error table are referenced according to the combination of ejection ink dots of colors to be ejected in the unit area based on the binary image data and the error obtained from the error table is passed sequentially to a subsequent unit area for accumulating the error for each color and wherein, for the unit area, a corrected number of ejection ink dots for each head is obtained from the correction table, an integer part of an absolute value of the accumulated error of a color in the unit area, if 1 or larger, is reflected on the number of the corrected ejection ink dots of the color in the unit area, the accumulated error is updated according to the reflection, and an ink of each color is ejected in the unit area according to the number of corrected number of ejection ink dots on which the integer part was reflected. This gives a device which implements the method according to the present invention described above.

When the ink of each color is ejected in the unit area according to the corrected number of ejection ink dots on which the integer part was reflected and if the number of ink dots instructed to be ejected in the image data must be increased or decreased, the control means increases or decreases the number of ink dots according to priority predetermined according to pixel positions within the unit area. This priority is preferably set so that the ejection ink dots of adjacent pixels in the unit area are not increased or decreased consecutively and so that an increase order or a decrease order of adjacent pixels are different between adjacent unit areas.

The error may be accumulated in consecutive unit areas horizontally or vertically over a whole image area.

Alternatively, the error occurred in the unit area is divided into two halves, and one half of the error may be accumulated in a horizontal direction of consecutive unit areas, and the other half in a vertical direction of consecutive unit areas, over the all unit areas.

A plurality of correction tables and error tables, each having its own limit value and/or unit area size, may be provided, and the control means may selectively use the plurality of correction tables and error tables according to various conditions. The various conditions include the type of recording medium, paper quality, the ink characteristics, the remaining amount of ink during printing, the temperature, the humidity, etc. This enables the number of ejection ink dots to be corrected according to various conditions.

BRIEF DESCRIPTION OF DRAWINGS

FIG. 6 is a diagram showing the dot thinning-out priority in the unit area in the embodiment of the present invention;

FIG. 7 is a diagram showing an example of the correction table in the embodiment of the present invention; and FIG. 8 is a diagram showing an example of the error table in the embodiment of the present invention.

BEST MODE FOR CARRYING OUT THE INVENTION

An embodiment according to the present invention will be described in detail with reference to the attached drawings.

Figure 1:
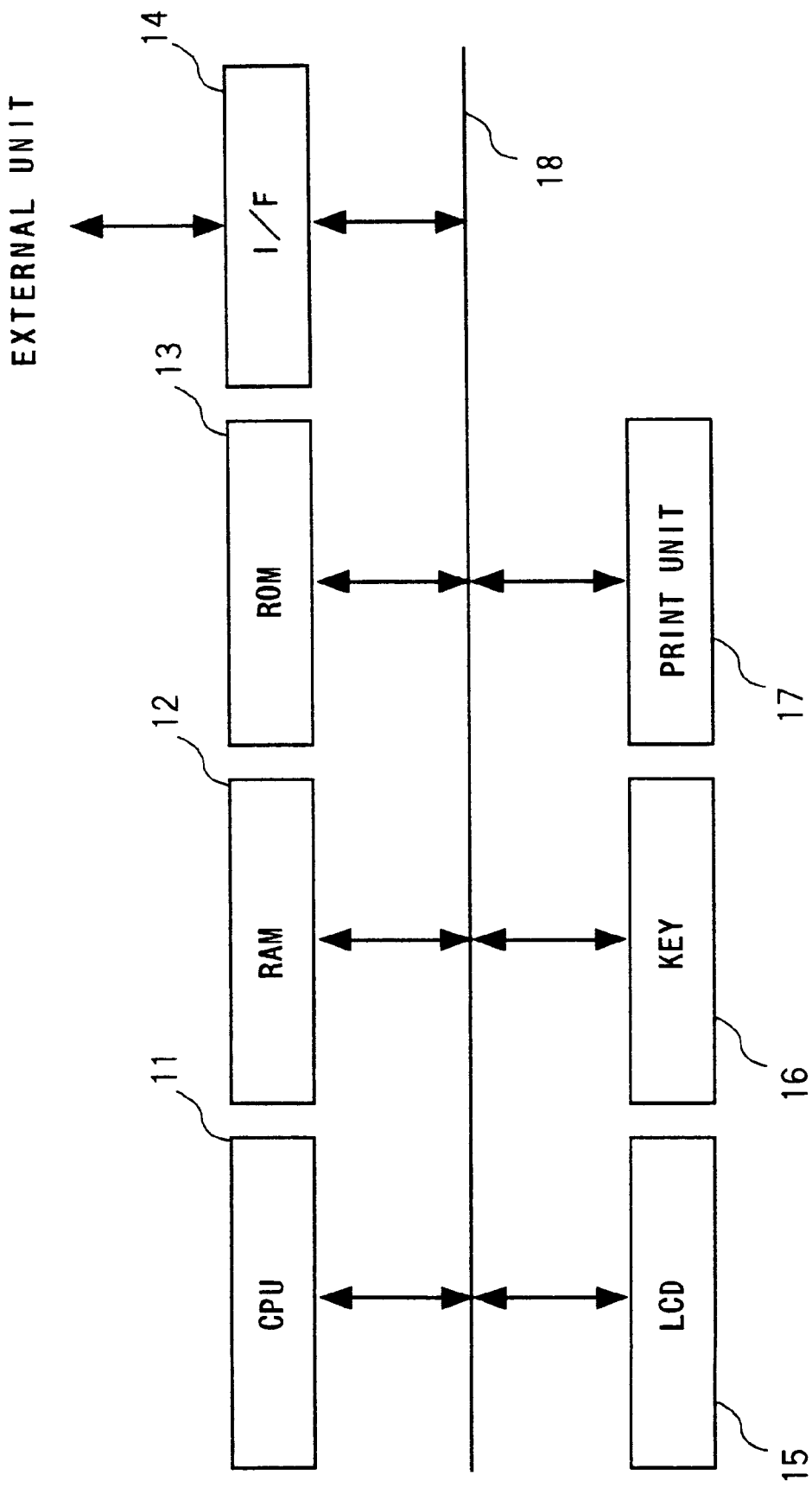
FIG. 1 is a block diagram showing the hardware configuration of an ink-jet recording device in an embodiment of the present invention.

FIG. 1 is a schematic block diagram showing the hardware configuration of an ink-jet recording device according to the present invention. In the figure, numeral 11 indicates a CPU controlling the overall operation of the device. Numeral 12 indicates a RAM for temporarily storing therein data and programs. Numeral 13 indicates a ROM for storing therein programs and data, in a non-volatile manner, the program being executed by the CPU 11 to run the ink-jet recording device. Numeral 14 indicates an interface via which the device connects to a computer terminal or to other units and to which binarized data is transferred from such an external device (not shown). Numeral 15 indicates an LCD for displaying operation indications, numeral 16 indicates a key operation unit for selecting various set-up items of the ink-jet recording device, numeral 17 is a print unit for driving ink-jet heads, and numeral 18 indicates a system bus.

The heads in the print unit 17 in the embodiment are of four colors, black (K), cyan (C), magenta (M), and yellow (Y), each provided with 128 nozzles and ejecting ink droplets corresponding to the binary image data.

Figure 2:
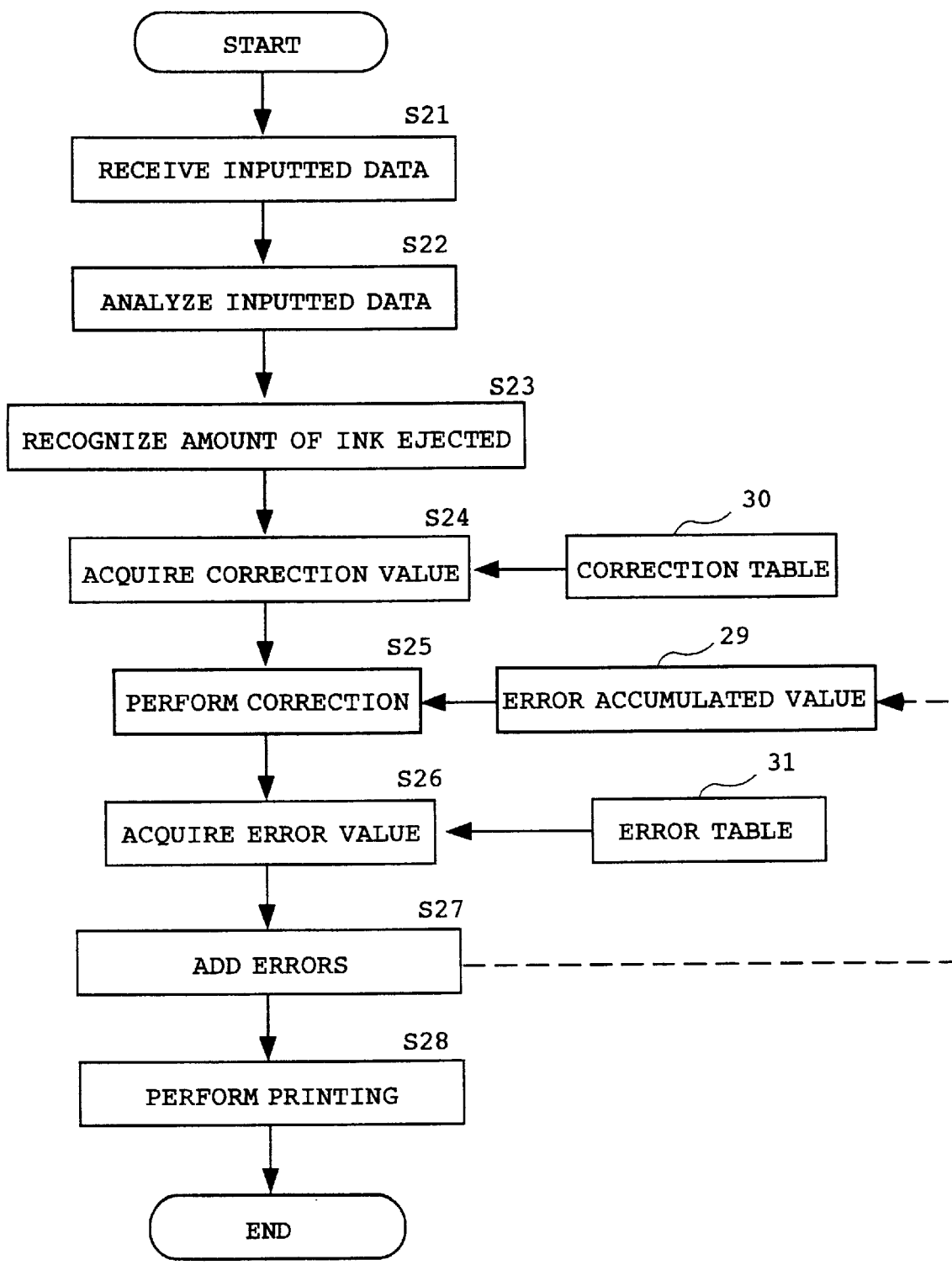
FIG. 2 is a flowchart showing the schematic processing flow of the ink-jet recording device of FIG. 1 from input data reception to printing.

FIG. 2 is a process flowchart showing the operation from the time input data is received to the time the data is printed.

First, input data is received from external (S21), and the received data is analyzed to prepare one band of print data suitable for recording with the ink-jet heads (S22). Next, for each color, a check is made for the ink ejection amount (number of ejection ink dots) of each unit area in each raster (S23), a correction table 30 is referenced based on the check result to obtain the corrected ink ejection amount (ink ejection amount after correction) (S24), and print data is corrected according to the corrected ink ejection amount (S25). During this correction, the corrected ink ejection amount is determined by the obtained corrected ink ejection amount and an error value which will be described later, and dot thinning-out is performed based on this corrected ink ejection amount (Dot addition could be performed for error correction as will be described later). Then, an error table 31 is referenced to obtain an error value corresponding to the ink ejection amount checked in S23 (S26), and this error value is added to an accumulated error value 29 (S27). Printing is performed according to the corrected ink ejection amount (S28).

In this embodiment, the correction of ink ejection amount is made for each unit area, which will be described later, in each raster. The print operation is performed for one band composed of a plurality of rasters. To do so, a buffer memory for accommodating one band of data is provided in the buffer memory in RAM 12.

Figure 3:
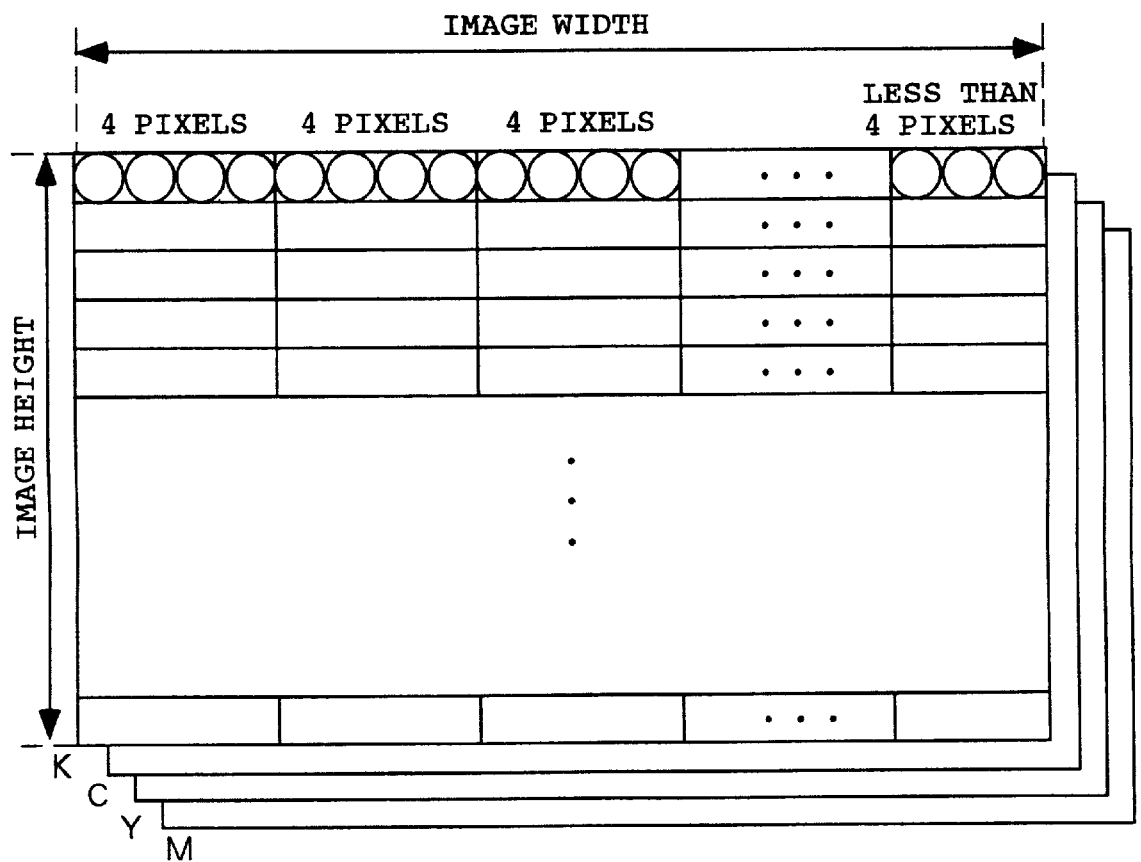
FIG. 3 is a diagram showing a unit area for which the correction processing of ink ejection amounts is performed in the embodiment of the present invention.

FIG. 3 shows a unit for which the correction of ink ejection amount is to be made in this embodiment. Dividing a print image into unit areas, each composed of four horizontal (head movement direction) pixels×one (paper transport direction) pixel, gives the best result in terms of cost performance. The rightmost unit area less than 4 dots in length is not processed. It should be noted that the present invention is not limited to a unit area composed of four pixels×one pixel but may be applied to a unit area composed of n pixels×one pixel (where, n is an integer, for example, between two and eight), one pixel×n pixels, or n pixels×m pixels (where, m is an integer, for example, between two and eight).

In this specification, the ink implanting density is represented in terms of % and, when one dot of one ink color is put on a one-pixel area, the ink implanting density is defined as 100%. For example, when four dots, each corresponding to one of four colors, are put on the same one-pixel area, the ink implanting density is 400%.

For a unit area composed of a four-pixel area of four horizontal pixels×one vertical pixel described above, when four dots of ink are ejected in any position and in any color within the unit area, the ink implanting density is 100%. Some examples are given below. When four dots of the same ink color are ejected, but no dot of other ink colors is ejected, in the unit area, the ink implanting density is 100%. When each of four ink colors is ejected in four dots in the unit area, the ink implanting density is 400%. When three dots of the same ink color are ejected, but no other ink color is ejected, in the same unit area, the ink implanting density is 75%. When four dots of the same ink color are ejected, and one dot of some other color is ejected, in the same unit area, the ink implanting density is 125%. When one dot of each of four ink colors is ejected in the same unit area, the ink implanting density is 100%, and when two dots of each of four ink colors are ejected in the same unit area, the ink implanting density is 200%.

The method according to the present invention divides a print image into such unit areas as described above and, for each of the unit areas, corrects (limits) the ink implanting density. If image quality is degraded by an ink blur when the 100% of ink implanting density is exceeded on a given recording medium, the ink implanting density in all unit areas should be corrected to an ink implanting density that is 100% or lower.

The minimum change unit (%) of the correction of the ink implanting density may be changed according to the unit area size. In this embodiment, since a print image is divided into areas each composed of four horizontal pixels×one vertical pixel, one dot put in one-pixel area, which is the minimum change unit, corresponds to 25%. For example, when a print image is divided into areas each composed of five horizontal pixels×one vertical pixel, one dot of ink ejection corresponds to 20% and therefore the ink implanting density can be corrected in increments of 20%. Similarly, when a print image is divided into three horizontal pixels× one vertical pixel, one dot of ink ejection corresponds to about 33% and therefore the ink implanting density may be corrected in increments of about 33%. These settings may be chosen on an experimental basis considering the ink blur characteristics of the recording medium and/or the head characteristics.

A target of the present invention is to limit the maximum ink implanting density to any given density. As an example, consider a case in which an image is printed so that all pixel areas, each composed of four horizontal pixels×one vertical pixel, in a unit area are each composed of two cyan dots and two yellow dots. The resulting image is green with the ink implanting density of the unit area being 100%.

When the ink implanting density is to be limited to 75%, the total number of ejection ink dots in the unit area must be decreased to three because the total number of pixels in the unit area is four. A problem occurs that which ink dot is to be deleted from the total of four ejection ink dots. If one cyan dot is simply deleted from every unit area, all unit areas are each composed of one cyan dot and two yellow dots and the target ink implanting density of 75% is attained. However, because one cyan dot is reduced in every unit area, the resulting image is yellowish green which will be different from the original color. To correct the ink implanting density to 75% without changing the color, dots must be deleted so that a unit area from which one cyan dot is deleted and a unit area from which one yellow dot is deleted alternately appear.

As a second example, consider a case in which an image is printed so that all unit areas are each composed of four cyan dots and one magenta dot. The resulting image is blue which is close to cyan with the ink implanting density of all unit areas being 125%.

In this case, when the ink implanting density is to be limited to 100%, the total number of ejection ink dots in the unit area must be decreased to four because the total number of ejection ink dots in the unit area is five. As in the example described above, it is desirable that a unit area from which one cyan dot is deleted and a unit area from which one magenta dot is deleted alternate. However, the ratio of the number of cyan dots to the number of magenta dots is changed from 4:1 to 3.5:0.5 and, as the ratio changes, the color changes. In addition, the two examples given above are single-color images and therefore not directly applicable to complex natural images.

Figure 4:
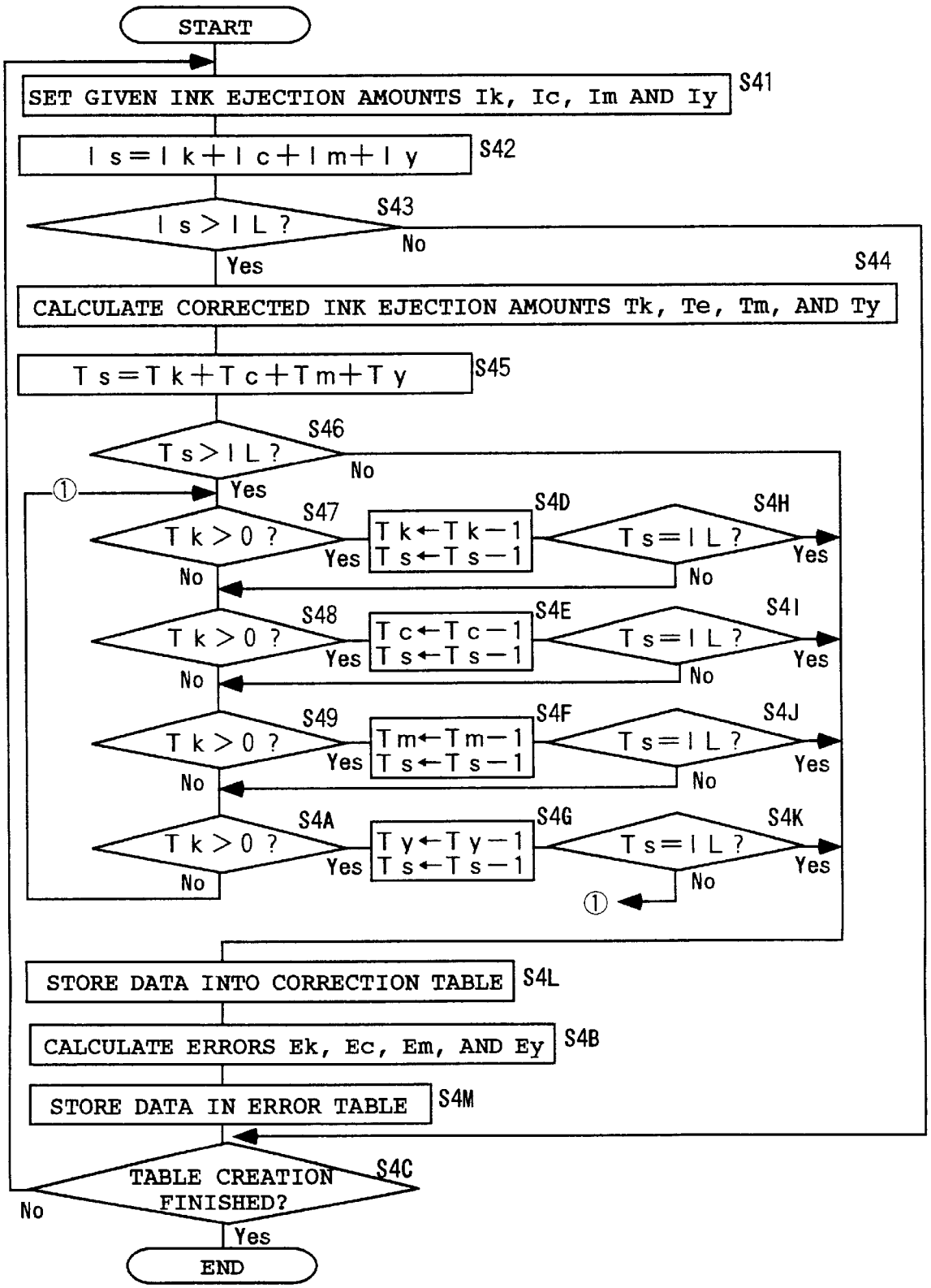
FIG. 4 is a flowchart showing the creation of a correction table and an error table in the embodiment of the present invention.

The method according to the present invention intends to correct the ink ejection amount while keeping the change in ink color ratio to a minimum. The method for creating the correction table 30 and the error table 31 that are used for the correction will now be described with reference to the flowchart in FIG. 4.

First, given ink ejection amounts are set in S41. The given ink ejection amounts of black, cyan, magenta, and yellow are represented as Ik, Ic, Im, and Iy, respectively. The initial values are 0, 0, 0, and 0, respectively. Since the full image area is divided into unit areas each composed of four horizontal pixels x one vertical pixel in this embodiment, Ik, Ic, Im, and Iy each may take one of five values, 0, 1, 2, 3, and 4. Therefore, if the correction table is created using all possible combinations of the values, there are 625 (=5×5× 5×5) combinations. For each of those combinations whose total of all color values exceeds a limit value, the processing shown in FIG. 4 creates correction data indicating how many dots of what ink color will be used and stores the created correction data in the correction table. Therefore, the ink ejection amount of each color that is set in S41 is sequentially updated until the table creation is finished in S4C which will be described later.

In S42, the total Is of the given ink ejection amounts Ik, Ic, Im, and Iy of respective ink colors used in the unit area is calculated. The value obtained by converting the limit ink implanting density into the total of ink ejection amounts is defined as a limit value IL. In this embodiment in which the unit area is composed of four pixels, IL=4 when the limit ink implanting density is 100%, IL=5 when it is 125%, and IL=6 when it is 150%.

In S43, a check is made if Is>IL, that is, if the total Is of the ink ejection amounts that were set in S41 exceeds the limit value IL that is the limit of ink print amount. If the total does not exceeds the limit value, dot deletion (thinning-out) is not necessary. Then, the ink ejection amounts are stored in the correction table 30 as corrected ink ejection amounts corresponding to the ink ejection amounts Ik, Ic, Im, and Iy (S4L). However, because these values are not used, the storage of the values may be omitted. In this case, no error calculation is performed in S4B. In the subsequent step S4M, zeros are stored in the corresponding locations in the error table 31 as error values. However, because these values are not used, the storage of the values may be omitted. In S4C, it is checked whether table creation is ended, that is, whether all combinations of ink ejection amounts have been processed. If the processing is not finished, control is returned to S41 to set the ink ejection amounts of the next combination.

If Is>IL in S43, then it is determined that dot deletion is necessary and control is passed to S44 that is the next step.

In S44, the corrected ink ejection amount for each color is calculated. Let Tk', Tc', Tm', and Ty' be the corrected ink ejection amount of black, cyan, magenta, and yellow, respectively. Then, the corrected ink ejection amounts are calculated by the following expressions:

$$Tk'=Ik \times IL/Is \quad (1)$$

$$Tc'=Ic \times IL/Is \quad (2)$$

$$Tm'=Im \times IL/Is \quad (3)$$

$$Ty'=Iy \times IL/Is \quad (4)$$

These expressions indicate that the limit value IL that is the total of the ink ejection amounts of all ink colors are proportionally distributed according to the ink ejection amount of each color. The total of Tk', Tc', Tm', and Ty' equals IL.

The values of Tk', Tc', Tm', and Ty' are not always integers. Therefore, the calculation results of expressions (1)–(4) are rounded to the nearest whole numbers to produce integers. The resulting integers are Tk, Tc, Tm, and Ty, respectively.

In S45, the total Ts of the corrected ink ejection amounts of the ink colors, calculated in S44, is calculated. As a result of the rounding of Tk', Tc', Tm', and Ty', the total of Tk, Tc, Tm, and Ty may exceed the limit value IL again. Therefore, in S46, a check is made if Ts>IL, that is, if Tk+Tc+Tm+Ty=Ts exceeds the limit value IL. If not, current values of Tk, Tc, Tm, and Ty are stored in the correction table as corrected ink ejection amounts. In S4B that follows, error calculation processing is performed. This error calculation processing will be described later. If the total Ts exceeds IL in S46, the judgment processing from S47 to S4A and the associated processing (S4D–S4K) are repeated, as necessary, until Ts matches IL.

In this embodiment, the deletion ink color order, in which the ink ejection amounts are decreased until the total Ts matches the limit value IL, is black, cyan, magenta, and yellow (in ascending order of brightness or saturation). However, it is to be noted that the present invention is not limited to this order.

The new corrected ink ejection amounts Tk, Tc, Tm, and Ty, calculated by correcting the corrected ink ejection amount according to Ts, are stored in the correction table 30 as "corrected ink ejection amount" (S4L).

When the corrected ink ejection amounts are decided for each combination of the ink ejection amounts Ik, Ic, Im, and Iy of the ink colors, the calculation results of expression (1)–(4) are rounded off. This rounding changes the ratios among the numbers of ejection dots of four ink colors and therefore generates errors (quantization errors) affecting the composed color. S4B is a step to calculate these error amounts.

Let Ek, Ec, Em, and Ey be errors in the amount of black, cyan, magenta, and yellow ink, respectively. These errors are calculated by the following expressions:

$$Ek=Tk'-Tk \quad (5)$$

$$Ec=Tc'-Tc \quad (6)$$

$$Em=Tm'-Tm \quad (7)$$

$$Ey=Ty'-Ty \quad (8)$$

The calculated values Ek, Ec, Em, and Ey are stored in the error table 31 as "errors" corresponding to the combination of the ink ejection amounts Ik, Ic, Im, and Iy. It should be noted that Tk, Tc, Tm, and Ty in the above expressions are values corrected in S4D–S4G. This is the reason why an example of error table 31 in FIG. 8 contains an error value whose absolute value exceeds 1.

Next, some calculation examples of values stored in the tables will be described. Assume that the ink ejection amounts of the colors, Ik, Ic, Im, and Iy, are given as 1, 2, 1, and 3, respectively. Also assume that the limit of the ink implanting density is 100% (four ink dots in a unit area composed of four pixels×one pixel). In this case, the expressions (1)–(4) give the following results:

$$Tk'=Ik \times IL/Is=1\times4/7=0.571$$

$$Tc'=Ic \times IL/Is=2\times4/7=1.143$$

$$Tm'=Im \times IL/Is=1\times4/7=0.571$$

$$Ty'=Iy \times IL/Is=3\times4/7=1.714$$

The resulting values are rounded, with the result that Tk, Tc, Tm, and Ty are 1, 1, 1, and 2, respectively. The total Ts of these values is 5, which is larger than the limit value of 4 by 1. This requires that the ink ejection amount be decreased by 1. Because the ink ejection amount Tk of the first reduction candidate ink color, black, is 1, the value of Tk is reduced by 1 to 0. Thus, Tk, Tc, Tm, and Ty become 0, 1, 1, and 2, respectively. These corrected ink ejection amounts are stored in the correction table 30 in the locations corresponding to the ink ejection amount values Ik, Ic, Im, and Iy that are 1, 2, 1, and 3.

In addition, the expressions (5)–(8) described above give the ink color error values as follows:

$$Ek=Tk'-Tk=0.571-0=0.571$$

$$Ec=Tc'-Tc=1.143-1=0.143$$

$$Em=Tm'-Tm=0.571-1=-0.429$$

$$Ey=Ty'-Ty=1.714-2=-0.286$$

These error values are stored in the error table 31 in the locations corresponding to the ink ejection amount values Ik, Ic, Im, and Iy that are 1, 2, 1, and 3.

The correction table 30 and the error table 31 are created as described above. This table creation processing is executed only once for table creation. Once the values are stored in a non-volatile memory such as a ROM, there is no need to perform the processing thereafter.

FIGS. 7 and 8 show the examples in configuration of the correction table 30 and the error table 31. Although all combinations ink ejection amounts Ik, Ic, Im, and Iy are shown for convenience, the table entries for combinations in which the total Is of Ik, Ic, Im, and Iy does not exceed the limit value IL need not be included in the tables.

Next, the correction of the number of ejection dots that is performed using the correction table 30 and the error table 31 during actual printing will be described with reference to FIG. 5. This correction processing passes an error occurring in a unit area on a raster to a subsequent unit area on the same raster to distribute the error. Therefore, even when an error occurs in a unit area, this correction processing adjusts the error in a subsequent unit area. That is, even when the ink color ratio in a unit area is changed from the original ratio after dot reduction, the error is compensated for in the neighboring areas. Because the size of a unit area is very small with respect to the full area size of the image, this error distribution rarely degrades image quality.

Figure 5:
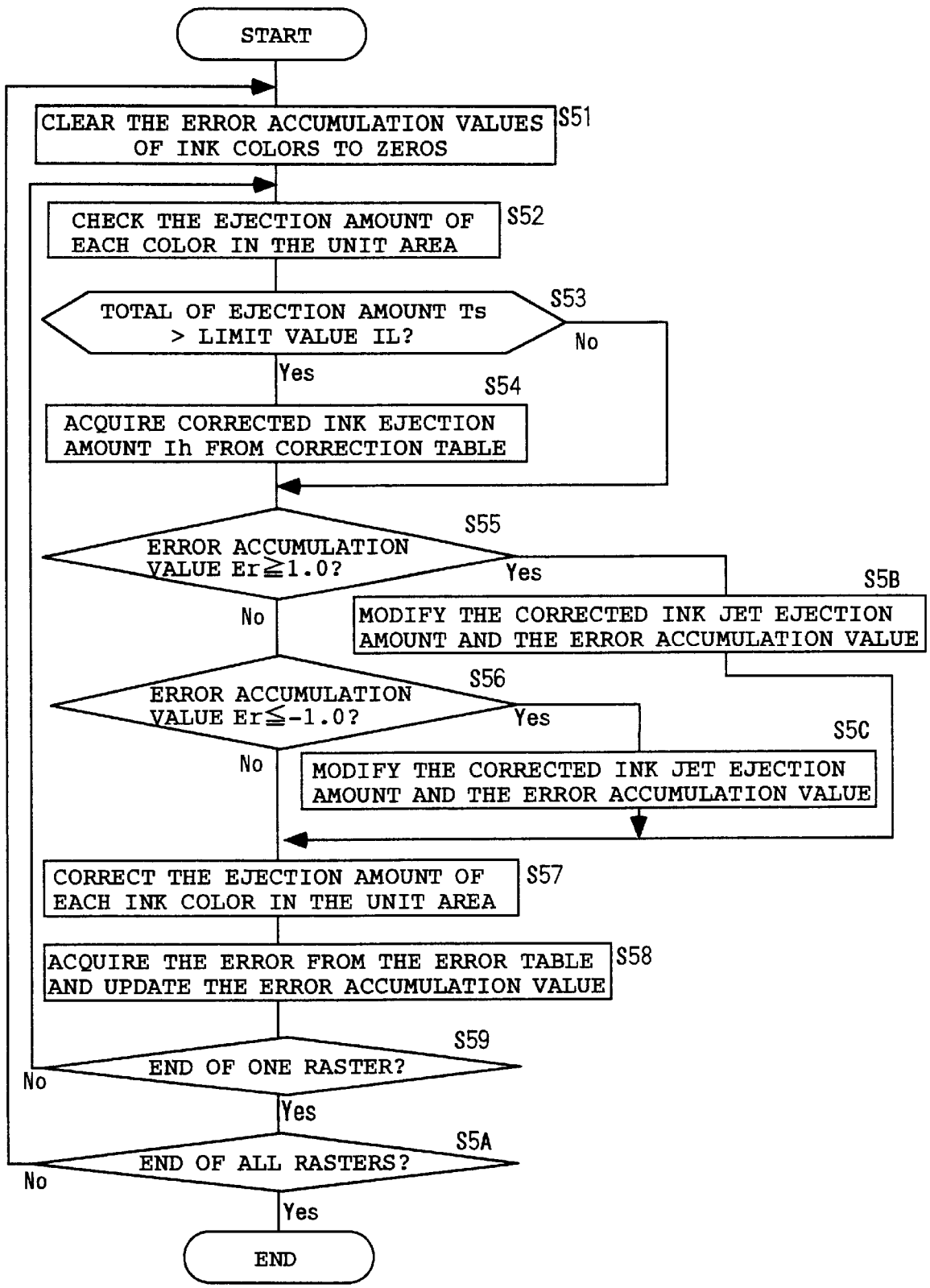
FIG. 5 is a flowchart showing the correction processing using the correction table and the error table of FIG. 4.

During the correction processing shown in FIG. 5, an image to be printed, which is divided into unit areas, are processed from top to bottom, one raster at a time. Within one raster, the unit areas are processed sequentially from left to right. First, at the beginning of a raster, the error accumulation values are cleared to 0 in S51. In S52–S59 that follow, one raster is processed.

In S52, the total of the ink ejection amounts (total number of ejection ink dots) in the first unit area in the raster is checked. In S53, a check is made for the total of ink ejection amounts if it exceeds the limit value (four in this case). If the total exceeds the limit value, the processing in S54 and the subsequent steps are executed. If the total does not exceed the limit value, control is passed to S55.

If the total of ink ejection amounts exceeds the limit value, the corresponding corrected ink ejection amount is obtained first from the correction table 30 in S54. Then, in S55, if the accumulated error value passed from the preceding unit area is 1.0 or larger, the corrected ink ejection amount and the error accumulation value are modified in S5B. That is, the modification is made using the expressions shown below, where Ih is the corrected ink ejection amount in the correction table 30, Ir is the corrected ink ejection amount after modification, Er is the error accumulation value, En is the error accumulation value whose decimal part is truncated (that is, an integer part), Ia is a modification allowable value, and S is the size of the unit area.

$$Ia=En \text{(when } S-Ih \geq En\text{)} \tag{9}$$

$$Ia=S-Ih \text{(when } S-Ih<En\text{)} \tag{10}$$

$$Ir=Ih+Ia \tag{11}$$

$$Er \leftarrow Er-Ia$$

The integer part En of the error accumulation value Er is not used directly to modify (increase) the corrected ink ejection amount Ir in the correction table 30, but the amount of modification to the corrected ink ejection amount Ir is decided according to the value S–Ih which is the "allowance" of the corrected ink ejection amount Ih with respect to the unit area size S. Because the maximum number of ink dots in the unit area is S, the number of ink dots exceeding S–Ih cannot be physically increased. This modification amount is the modification allowable value Ia calculated in expressions (9) and (10).

Some examples are given below. If the error accumulation value Er=1.5, then En=1.0. If Ih=3, then S–Ih=4–3=1≧En=1, then Ia=En=1. Therefore, $$Ia=En=1$$

$$Er=Er-Ia=1.5-1=0.5$$

Also, if the error accumulation value Er=2.5, then En=2.0. If Ih=3, then S–Ih=4–3=1<En=2. Therefore, $$Ia=S-Ih=4-3=1$$

$$Er=Er-Ia=2.5-1=1.5$$

If the error accumulation value Er of an ink is equal to or less than –1.0 in S55, the corrected ink ejection amount and the error accumulation value are modified according to the following expressions in S5C:

$$Ia=-En \text{(when } Ih \geq -En\text{)} \tag{12}$$

$$Ia=Ih \text{(when } Ih<-En\text{)} \tag{13}$$

$$Ir=Ih-Ia \tag{14}$$

$$Er \leftarrow Er+Ia$$

Again, the integer part –En of the error accumulation value Er is not used directly to modify the corrected ink ejection amount Ir in the correction table 30, but the amount of modification to the corrected ink ejection amount Ir is decided according to the relation of the corrected ink ejection amount Ih to –En. The modification amount is decided in this manner in order to prevent the modified Ih from becoming negative.

The modification to the corrected ink ejection amount and the error accumulation value described above is made for each ink color. Even if the total of modified ink ejection amounts of all colors exceeds the limit of the ink ejection amount, the modification is allowed to suppress the change in color.

In S57, the ejection amount of ink colors in the unit area is corrected based on the final correction values of ink colors obtained as described above.

FIG. 6 shows the priority to be used in correcting the ink ejection amount in a unit area. This priority is established basically so that the ink dots of adjacent pixels in the unit area are not thinned out regardless of the size and the shape of the unit area and so that the pixel thinning-out orders of adjacent unit areas are not the same. This arrangement prevents an image quality degradation that may be caused by stripes or the like generated by dot thinning-out.

For example, assume that the ink ejection amount of an ink color is three and that the corrected ink ejection amount is two. In an even-numbered raster, a check is made for the data of the leftmost pixel (first pixel) in the unit area. If that pixel data is to be printed, it is determined that the dot is not printed. If the data of the pixel is not to be printed, the check is made in order of the second pixel from the right (third pixel), second pixel from the left (second pixel), and rightmost pixel (fourth pixel). The number of ink dots is reduced until the ink ejection amount in the unit area becomes 2 that is the corrected ink ejection amount. In an odd-numbered raster, the check is made in order of the third pixel, second pixel, fourth pixel, and first pixel.

It should be noted that the above principle does not require the dot thinning-out priority be the one shown in the figure. Also, the priority may be established similarly for a unit area which is not one pixel×four pixels in size.

Furthermore, as a result of error accumulation, there is a possibility that ink dots are not thinned out but added during the ink ejection amount correction. In such a case, the addition priority may be the one shown in FIG. 6.

In S58 that follows S57, the error in the error table 31 corresponding to the ejection amount checked in S52 is obtained and this error is added to the error accumulation value Er for each ink color.

Then, the correction processing for a given unit area is finished. Next, processing proceeds to the unit area that is right to the unit area that has been processed. If the next right unit area is at the end of the raster and smaller than four horizontal pixels×one vertical pixel, it is not processed in this embodiment. The completion of processing of the unit area in the rightmost position of the raster means that processing for one raster is finished and, as a result of the checking in S59, control is passed to S5A. In S5A, control is passed back to S51 to process the next raster until all rasters are processed. When all rasters are processed, the correction processing for the image to be printed is finished.

When printing is performed by ejecting ink from the heads, one band at a time, the correction processing and the printing processing, shown in FIG. 5, may be repeated for each band.

The processing described above limits the ink ejection amount to a predetermined density to suppress an ink blur and to give a good image while keeping the change in color to a minimum even for a complex image such as a natural picture. In addition, the size of a unit area or the limit of the ink implanting density may be changed according to the conditions such as ink blur characteristics of the recording medium, remaining amount of ink during printing, temperature, humidity, or differences in individual ink-jet recording devices. To meet these requirements, a plurality of correction tables and error tables, described above, may be prepared for switching the tables to use according to the conditions.

Although the error is distributed only in one direction (head movement direction) in the above embodiment, the error may be divided into two halves and distributed in two directions, one in the head movement direction and the other in the direction vertical to the head movement.

Furthermore, in order to reduce the load during correction processing shown in FIG. 5, control may be passed to S59 regardless of the error accumulation amount to omit the correction of ink ejection amount if the total Ts of ejection amounts does not exceed the limit value in S53.

Industrial Applicability

The present invention, applicable to the design and manufacturing of an ink-jet recording device, can prevent image quality degradation caused by an ink blur in a high-density print area where data is printed according to the ink implanting density on the recording medium while keeping the change in color of a color image to a minimum.

What is claimed is:

1. An ink-jet recording method for putting a plurality of ink dots on the same pixel position using multiple-color ink heads to record a color image, said ink-jet recording method comprising the steps of:

(a) dividing a whole image area into a plurality of unit areas each composed of a predetermined plurality of pixels;

(b) for each unit area of the image to be recorded, calculating a total of ejection ink dots instructed to be printed in the unit area;

(c) checking if the calculated total of ink dots exceeds a predetermined limit value;

(d) if so, proportionally distributing the limit value to colors according to mutual ratios among numbers of ink dots of the colors to be ejected in the unit area and rounding each of distribution results to an integer to determine a number of ejection ink dots of each color in the unit area;

(e) correcting the instructed number of ink dots of each color by reducing the same based on the determined number of ejection ink dots of each color;

(f) ejecting ink from each head into the unit area according to the corrected number of ejection ink dots; and (g) when reducing the number of ejection ink dots in step (e), the ejection ink dots are thinned out according to an ejection ink dot reduction priority pre-established for each pixel position in the unit area.

2. The ink-jet recording method according to claim 1, wherein the priority is established so that the ejection ink dots of adjacent pixels in the unit area are not thinned out consecutively and so that thinning-out orders of adjacent pixels are different between adjacent unit areas.

3. An ink-jet recording method for putting a plurality of ink dots on the same pixel position using multiple-color ink heads to record a color image, said ink-jet recording method comprising the steps of:

(a) dividing a whole image area into a plurality of unit areas each composed of a predetermined plurality of pixels;

(b) for each unit area of the image to be recorded, calculating a total of ejection ink dots instructed to be printed in the unit area;

(c) checking if the calculated total of ink dots exceeds a predetermined limit value;

(d) if so, proportionally distributing the limit value to colors according to mutual ratios among numbers of ink dots of the colors to be ejected in the unit area and rounding each of distribution results to an integer to determine a number of ejection ink dots of each color in the unit area;

(e) correcting the instructed number of ink dots of each color by reducing the same based on the determined number of ejection ink dots of each color; and (f) ejecting ink from each head into the unit area according to the corrected number of ejection ink dots;

(g) wherein an error generated by rounding the result of the proportional distribution of the limit value to the integer, in step (d), is accumulated and passed to an adjacent unit area for each area and, when an absolute value of the accumulation value becomes 1 or larger, the accumulation value is reflected on the determined number of ejection ink dots of each color in the adjacent unit area.

4. The ink-jet recording method according to claim 3 wherein, when the total of the numbers of ejection ink dots of the colors exceeds the limit value, the number of ejection ink dots is reduced by the exceeded number of the ejection ink dots according to a predetermined color order, each of said numbers of ejection ink dots of each color having been rounded to an integer, and wherein, for the color whose ejection ink dots have been reduced, the number of reduced ejection ink dots is added to the error of the color in the unit area.

5. An ink-jet recording device which puts a plurality of ejection ink dots on the same pixel position using multiple-color ink heads to record a color image, said ink-jet recording device comprising:

a plurality of heads each of which ejects ink droplets based on binary image data;

a correction table which contains a number of ejection ink dots of each head limited in advance according to a combination of the numbers of ejection ink dots instructed to be ejected for respective colors in a unit area in such a way that the total number of ejection ink dots does not exceed a predetermined limit value, said unit area being composed of a predetermined plurality of pixels;

an error table which contains errors which may be produced when determining the limited numbers of ejection ink dots of the colors and which are previously calculated and determined according to the combination of the numbers of ejection ink dots specified for the colors in the unit area; and a control means for controlling an ink ejection of the plurality of heads based on the corrected binary image data, wherein said control means sequentially processes a plurality of the consecutive unit areas, one unit area at a time, during which said correction table and said error table are referenced according to the combination of ejection ink dots of colors to be ejected in the unit area based on the binary image data and the error obtained from said error table is passed sequentially to a subsequent unit area for accumulating the error for each color, and wherein, for the unit area, a corrected number of ejection ink dots for each head is obtained from said correction table, an integer part of an absolute value of the accumulated error of a color in the unit area, if 1 or larger, is reflected on the number of the corrected ejection ink dots of the color in the unit area, the accumulated error is updated according to the reflection, and an ink of each color is ejected in the unit area according to the number of corrected number of ejection ink dots on which the integer part was reflected.

6. The ink-jet recording device according to claim 5 wherein when the ink of each color is ejected in the unit area according to the corrected number of ejection ink dots on which the integer part was reflected and if the number of ink dots instructed to be ejected in the image data must be increased or decreased, said control means increases or decreases the number of ink dots according to priority predetermined according to pixel positions within the unit area.

7. The ink-jet recording device according to claim 6 wherein the priority is set so that the ejection ink dots of adjacent pixels in the unit area are not increased or decreased consecutively and so that an increase order or a decrease order of adjacent pixels are different between adjacent unit areas.

8. The ink-jet recording device according to claim 7 wherein a plurality of correction tables and error tables, each having its own limit value and/or unit area size, are provided and wherein said control means selectively uses said plurality of correction tables and error tables according to various conditions.

9. The ink-jet recording device according to claim 6 wherein a plurality of correction tables and error tables, each having its own limit value and/or unit area size, are provided and wherein said control means selectively uses said plurality of correction tables and error tables according to various conditions.

10. The ink-jet recording device according to claim 5 wherein the error is accumulated in consecutive unit areas horizontally or vertically over a whole image area.

11. The ink-jet recording device according to claim 10 wherein a plurality of correction tables and error tables, each having its own limit value and/or unit area size, are provided and wherein said control means selectively uses said plurality of correction tables and error tables according to various conditions.

12. The ink-jet recording device according to claim 5 wherein the error occurred in the unit area is divided into two halves and wherein one half of the error is accumulated in a horizontal direction of consecutive unit areas, and the other half in a vertical direction of consecutive unit areas, over the all unit areas.

13. The ink-jet recording device according to claim 12 wherein a plurality of correction tables and error tables, each having its own limit value and/or unit area size, are provided and wherein said control means selectively uses said plurality of correction tables and error tables according to various conditions.

14. The ink-jet recording device according to claim 5 wherein a plurality of correction tables and error tables, each having its own limit value and/or unit area size, are provided and wherein said control means selectively uses said plurality of correction tables and error tables according to various conditions.

* * * * *